United States Patent [19]
Graham

[11] 3,780,569
[45] Dec. 25, 1973

[54] TENSIOMETER ASSEMBLY FOR SUBSTITUTION TYPE ANALYTICAL BALANCES

[76] Inventor: John W. Graham, Rt. 3, Box 41, Alvin, Tex. 77511

[22] Filed: Sept. 2, 1971

[21] Appl. No.: 177,223

[52] U.S. Cl. .............................................. 73/64.4
[51] Int. Cl. .......................................... G01n 13/02
[58] Field of Search ........................... 73/64.4, 103; 177/229

[56] References Cited
UNITED STATES PATENTS
3,415,109  12/1968  Sucker et al. ......................... 73/64.4

FOREIGN PATENTS OR APPLICATIONS
1,254,889  11/1964  Germany ............................. 73/64.4
613,800  12/1960  Italy .................................... 73/64.4

OTHER PUBLICATIONS
Janz, G. J. et al., Precise Measurement of Density & Surface Tension, In Rev. of Sci. Ins., 31(1)–p. 18–22, Jan. 1960.

*Primary Examiner*—Richard C. Queisser
*Assistant Examiner*—Joseph W. Roskos
*Attorney*—Tom Arnold et al.

[57] ABSTRACT

A tensiometer assembly for use with substitution type analytical balances that is particularly designed to take the place of the conventional weighing pan with which such balances are commonly provided. The tensiometer assembly comprises an elongated support mechanism having a support eye at the upper extremity thereof that is adapted to be received by the hook portion of the weighing arm of a substitution type analytical balance, thereby suspending the tensiometer assembly in vertical relation within the weighing chamber of the balance. The support mechanism includes a needle chuck device, disposed at the lower extremity thereof, that is adapted to support a conventional duNouy ring in substantially rigid relation with the support mechanism. A container for a liquid defining the interface to be tested may be raised or lowered in accurately controllable manner by a movable support device. The support device may be capable of moving the container downwardly at a controlled rate of speed thereby moving the interface downwardly past the ring portion of a duNuoy ring or other suitable tensiometer device suspended in the liquid by the support mechanism. The force necessary to move the duNuoy ring through the liquid interface is accurately measured by the analytical balance.

11 Claims, 6 Drawing Figures

PATENTED DEC 25 1973 3,780,569

TENSIOMETER ASSEMBLY FOR SUBSTITUTION TYPE ANALYTICAL BALANCES

FIELD OF THE INVENTION

The present invention relates generally to the measurement of surface tension and the measurement of the speed at which surface molecules spread. More particularly, the invention relates to the combination, with a substitution type analytical balance, of a mechanism providing the substitution balance with the capability for measuring surface tension and for measuring the spreading speed of surface active molecules through employment of the conventional duNouy principle of surface tension measurement.

The ability to measure surface and interfacial tensions accurately and rapidly is becoming very desirable in many analytical laboratories. With increasing national emphasis on pollution control, there is considerable interest in methods of detecting trace amounts of contaminants in natural waters. One of the simplest ways of monitoring water pollution caused by surface active substances such as detergents and oils is to compare the surface tension of a water sample with that of an uncontaminated sample. The tensiometer assembly disclosed herein offers every federal, state, industrial, university and private laboratory an inexpensive device for joining in the battle against pollution.

BACKGROUND OF THE INVENTION

Measuring of surface tension and measurement of the spreading speed of surface active molecules of a liquid are generally accomplished by specialized measuring instruments that are specifically designed with single measurement capability. Virtually no universal measuring and weighing instruments are available that have the capability of conventional weighing and the measurement of the surface tension properties of a liquid in addition to the capability for measuring the spreading velocity of surface-active molecules. It is therefore generally necessary to provide specialized testing equipment at considerable expense in the event both weighing and surface tension measurement are to be conducted at a single laboratory facility.

Where surface tension measurements are to be conducted, it is seldom possible to obtain accuracy greater than plus or minus 0.1 dynes per c.m. unless the tensiometer provided is delicately constructed with a high degree of mechanical and electrical sophistication to obtain an unusually high degree of accuracy. It is virtually impossible, however, to obtain surface tension measurements with the accuracy of a substitution type analytical balance although in many cases such is desirable.

Generally, a laboratory that would require a facility for measuring the surface tension of a liquid or the interfacial tension between liquids is also provided with an analytical balance to accomplish accurate weighing. Many such laboratories in fact are provided with analytical balances that employ the principle of substitution weighing to achieve precise measurement beyond the capability of most two pan type analytical balances. Accurate weighing under ideal circumstances requires that the weight of an unknown object be compared with a known weight under exactly the same conditions. The principle of substitution weighing has been found to provide weighing accuracy that is superior to most other weighing instruments. It would be desirable, therefore, to utilize the weighing accuracy of substitution type analytical balances to measure the surface tension of liquids to the degree of accuracy ordinarily within the capability of such instruments.

THE PRIOR ART

Devices for measuring surface tension by the duNouy principle have been in use for quite some time as evidenced by the U. S. Pats. to Schoenburg No. 1,960,224, Dopel No. 2,756,587 and Heneage No. 3,043,131. The duNouy principle of surface tension measurement has been incorporated into any number of different measuring devices that may employ mechanically induced variations of electrical current to produce greater measuring sensitivity than is ordinarily practical with mechanical measuring or weighing mechanisms. Certain of the surface tension measuring instruments may measure the concentration of surface active substances by employment of an adhesion element that is suspended from a balanced mechanism constructed specifically for this particular purpose (Hettche et al, U.S. Pat. No. 2,895,329). Measuring and recording of the boundary surface properties of various liquids has also been accomplished through the use of a Wheatstone bridge measuring circuit that measures the degree of torsion of a horizontally disposed torsion wire that is energized directly responsive to forces created by surface tension (Sucker et al, U.S. Pat. No. 3,415,109). Surface tension has also been measured by strain-gauge type testing machines employing a load cell, (*Review of Scientific Instruments*, Vol. 29, No. 9, Sept. 1958, pp 785–787).

Where interfacial tension between murky or opaque liquids, such as crude oil and water containing a fine dispersion of particles, is to be measured, it becomes relatively impossible to employ conventional methods such as the drop volume method or the pendant drop method of measuring the interfacial tension, because these methods require visual observation of the interface.

It is therefore a primary object of the present invention to provide a novel tensiometer assembly for use in combination with a substitution type analytical balance thereby extending use of the balance mechanism to measurement of the surface tension of a liquid interface.

It is also an object of the present invention to provide a novel tensiometer assembly that is of sufficient weight to approximate the weight of a balance pan that the tensiometer assembly replaces when converting a substitution type analytical balance to conduct measurements of surface tension.

It is an even further object of the present invention to provide a novel tensiometer assembly the weight of which may be varied selectively to provide a mechanism that may be substituted universally for the weighing pan devices of substitution balance instruments of various manufacture.

Among the several objects of the present invention is noted the contemplation of a novel tensiometer assembly that may be adjustably extended or shortened to compensate for differences in the height of the weighing chambers of substitution balances of different manufacture.

It is also an object of the present invention to provide a novel tensiometer assembly that includes means for controllably moving a liquid interface downwardly past a duNouy ring type tensiometer measuring device.

Another object of the present invention contemplates the provision of a novel tensiometer assembly having the capability of utilizing the measuring accuracy of a delicate substitution type analytical balance for accurate determination of surface and interfacial tension of various liquids including gas liquid interfaces and interfaces between quiescent liquids.

Another important object of the present invention concerns the provision of a novel tensiometer assembly that allows efficient measurement of interfacial tension even though the liquid being measured might be opaque or murky preventing visual observance of the relative positions of the interface and the duNouy ring.

It is an even further object of the present invention to provide a novel tensiometer assembly that is simple in nature, low in cost and reliable in use.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise an elongated tensiometer assembly having a weight portion at the upper extremity thereof with a support eye extending above the weight portion to be received by a support hook at the extremity of the arm of a substitution type analytical balance. A support stem extends downwardly from the weight portion and may be provided with a chuck or other suitable connection device for supporting a conventional duNouy ring that may be suspended with the ring portion thereof immersed in a liquid below the interface that is to be measured. A container in which the liquid is contained may rest upon a support base that is selectively movable upwardly or downwardly by a motor mechanism that may be a pneumatic or hydraulic jack device capable of raising or lowering the container at a particular rate of speed. Also, if desired, the mechanism for raising and lowering the container may comprise a mechanical apparatus such as a scissors-type platform jack or a jack mechanism that is actuated by an electric motor.

The support stem portion of the tensiometer assembly may be adjustable if desired to compensate for differences in overall height of the weighing chamber of substitution balances of different manufacture. Also, if desirable, the tensiometer assembly may include means for modifying the weight of the weight portion in order to compensate for differences in weight of the various weighing pans with which substitution balances may be supplied.

The tensiometer assembly of this invention is also useful in the measurement of the spreading velocity of surface active molecules. To accomplish measurement of surface molecule spreading velocity, an elongated narrow trough-like container is provided that is balanced upon a support mechanism located outwardly of the weighing chamber of the balance. A tensiometer assembly is suspended from the weighing arm of the analytical balance with a duNouy ring, carried thereby, placed in the interface at an end of the trough disposed within the weighing chamber of the balance. The level of the trough is adjusted so that the stationary distended interface is near the point of rupture. With the ring interface region in this condition the optical scale reading of the analytical balance is extremely sensitive to minute changes in the interfacial tension. The experimenter than may add a known quantity of surface active material or surfactant to the interface at the opposite end of the trough which are transmitted to the opposite end of the trough at the spreading velocity of the surface active molecules. Arrival of the first few molecules at the duNouy ring will be accompanied by an immediate change of the optical scale reading of the substitution balance thereby giving a "time-of-flight" value of the surface active molecules. The distance between the point of introduction of surfactant and the ring may then be divided by the time-of-flight value to yield the spreading velocity of the surface active molecules.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope for the invention may admit to other equally effective embodiments.

In the drawings:

FIG. 1 is a pictorial representation of a substitution type analytical balance with the weighing pan thereof removed and a tensiometer assembly constructed in accordance with the present invention substituted for the weighing pan.

FIG. 2 is an elevational view of a tensiometer assembly of FIG. 1 supporting a duNouy ring within a container of liquid supported by a pneumatic motor shown partially in section.

FIG. 3 is a sectional view taken along line 3—3 in FIG. 2.

FIG. 4 is a fragmentary elevational view of a tensiometer assembly representing a modified embodiment of the present invention.

FIG. 5 is an elevational view of a container of liquid having a duNouy ring supported therein, which container is adjusted manually by a mechanical jack mechanism.

FIG. 6 is a fragmentary side elevational view of a substitution type analytical balance supporting a tensiometer assembly constructed in accordance with the present invention and also showing a hydraulically energized movable support mechanism supporting an elongated trough thereby adapting the tensiometer assembly for measurement of the velocity of surface-active molecules.

DESCRIPTION OF PREFERRED EMBODIMENT

Figure 1:
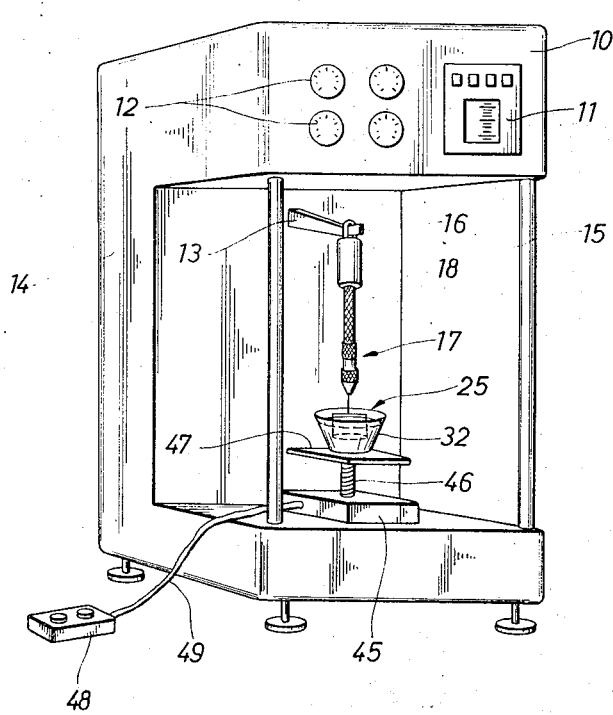

Now referring to the drawings and first to FIG. 1, there is illustrated a substitution type analytical balance 10 having the usual digital readout mechanism 11 and adjustment dials 12. A weighing arm 13 of the analytical balance 10 extends from an enclosed housing 14 into a weighing chamber or compartment 15 and includes at the free extremity thereof a support hook 16 that ordinarily is utilized as a support for a weighing pan disposed within the weighing chamber 15. Except for removal of the weighing pan the substitution type analytical balance otherwise remains unaltered and retains its conventional weighing capability.

To adapt a substitution type analytical balance for surface tension measurements a tensiometer assembly may be substituted for the weighing pan of a balance. The tensiometer assembly of this invention may conveniently take the form illustrated in FIG. 2 where there is disclosed a tensiometer assembly illustrated generally at 17 including a weight portion 18 having a support tab 19 formed at the upper extremity thereof and presenting a support eye 20 to be received by the support hook portion 16 of the weighing arm 13 of an analytical balance. A support stem 21 extends downwardly from the weight portion 18 which stem may, if desired, be knurled to facilitate manipulation of a needle chuck mechanism 22 carried at the lower extremity of the support stem. Although the weight portion is illustrated as being disposed at the upper extremity of the support stem, it is not intended that this particular arrangement be limiting, it being obvious that the weight portion may be disposed at the intermediate portion or lower portion of the support stem, if desired. The needle chuck assembly 22 includes a gripping portion 23 that is adapted to receive the support wire 24 of a conventional duNouy ring, illustrated generally at 25. It is not intended that the invention be limited to the use of a duNouy ring however, it being obvious that other devices such as a Wilhelmy Plate may also be supported by the tensiometer assembly and may be employed to preturb an interface. For purposes of simplicity however, the invention will be described in its relation with a duNouy ring type surface tensiometer.

The duNouy ring includes a horizontal beam 26 having vertical support elements 27 and 28 connected to the extremities thereof and supporting a ring 29 that may be introduced below the surface or interface 30 of a liquid 31 contained within a measuring vessel 32. As shown in the lower portion of FIG. 2, the measuring vessel 32 is supported by a support base 33 that may be moved upwardly or downwardly by a fluid motor mechanism illustrated generally at 34.

The fluid motor mechanism incorporates a piston 35 disposed for movement within a cylinder 36 by a pressure fluid such as air introduced into a chamber 37 below the piston by a hand pump assembly 38, which may be a flexible compressible bulb controlled by internal check valves in conventional manner and connected to the cylinder by a supply conduit 39. The piston 35 may be secured to base 33 by an actuating stem 40. A base 41 may be provided to support the fluid motor mechanism 34 and also to provide support for a bleed assembly 42 having a needle valve 43 that may be manually manipulated to control the exhaust of air from the chamber 37 through an exhaust conduit 44.

Alternative to the use of a pneumatic system for raising and lowering the measuring vessel 32 to achieve the interface testing procedure as illustrated in FIG. 1, an electric motor 45 may be employed to achieve rotation and thus reciprocation of a jack screw 46 connected to a base 47 supporting the measuring vessel 32. Raising or lowering of the base 47 may be achieved accurately through manipulation of the controls of a remote control mechanism 48 connected by a control cable 49 to the electric motor 45.

In order to provide a universal tensiometer assembly that may be utilized with equal effectiveness with substitution balances of different manufacture, it may be necessary to vary the length of the tensiometer assembly to compensate for weighing chambers of different heights and to vary the weigh of the tensiometer mechanism to compensate for differences in weights of the weighing pans. A universal tensiometer assembly therefore may conveniently take the form illustrated in FIG. 4, where a tensiometer assembly illustrated at 50 may include a weight portion 51 that is suspended by a support eye in the same manner as described above in relation to the tensiometer assembly 17 of FIG. 2.

The weight portion 51 of the tensiometer assembly may be provided with an annular flange 52 at the lower extremity thereof that may be formed integrally with the weight portion 51 or may be secured to the tensiometer assembly 50 in any desirable manner. The annular flange 52 presents an upper shoulder 53 that may be engaged to provide support for a plurality for weight rings or washers 54 that serve to effectively vary the weight of the tensiometer assembly thereby compensating for differences in weight of the balance pans for which the tensiometer assembly is to be substituted.

Figure 5:
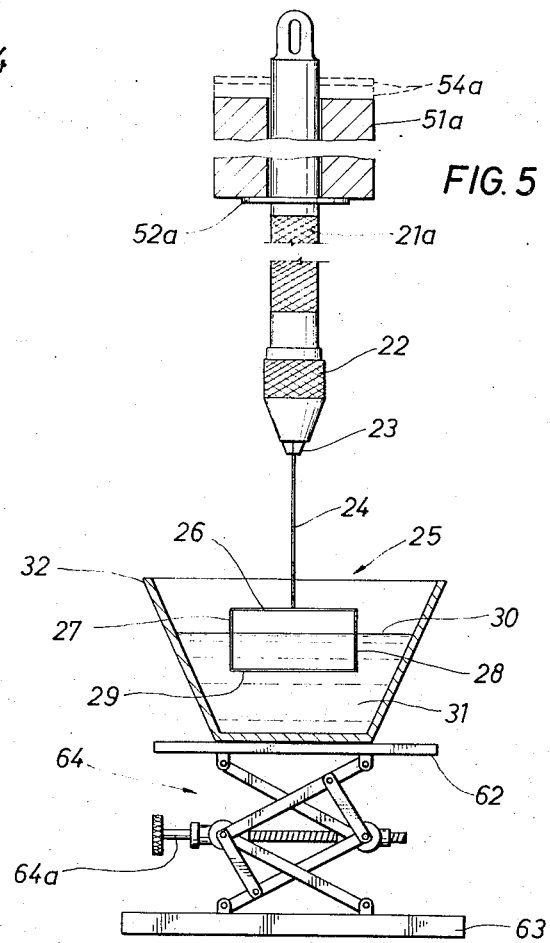

As illustrated in FIG. 5 a support stem 21a may be provided having a flange 52a adapted to support a weight 51a that when added to the weight of the support stem substantially equals the weight of a balance pan. The total weight of the tensiometer assembly may be adjusted simply by replacing the removable weight 51a with another weight or by adding weight rings that may be received by the upper portion of the support stem 21a as shown in broken lines at 54a.

The tensiometer assembly 50 may also be provided with a support stem portion that can be elongated or shortened in order to compensate for differences in the height of the weighing chamber of analytical balances of different manufacture. To achieve adjustable elongation or shortening of the support stem portion of the tensiometer assembly, a support stem may be composed of an upper stem section 55 of generally tubular form, within which is telescopically received a lower stem section 56. The outer stem section 55 may be provided with a lower externally threaded extremity 57 having a plurality of fingers 58 defined by a plurality of slots cut in the threaded portion of the upper support stem section. A locking member 59, having internal threads 60, may be received by the threaded portion 57 of the upper stem section 55 and may be manually manipulated to achieve sufficient movement of the fingers 50 to lock the telescoping stem sections 55 and 56 in any suitable telescoping relationship.

Figure 2:
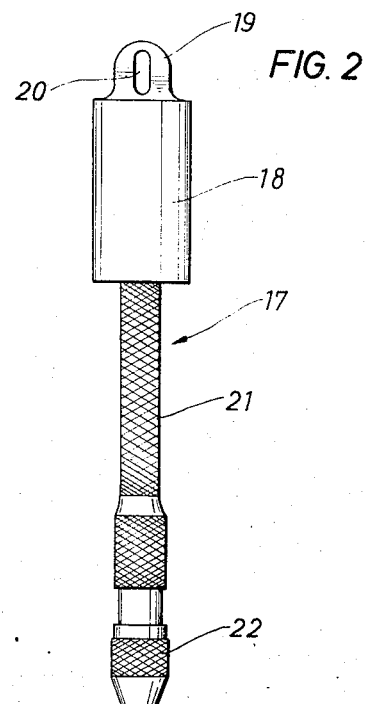
Figure 3:
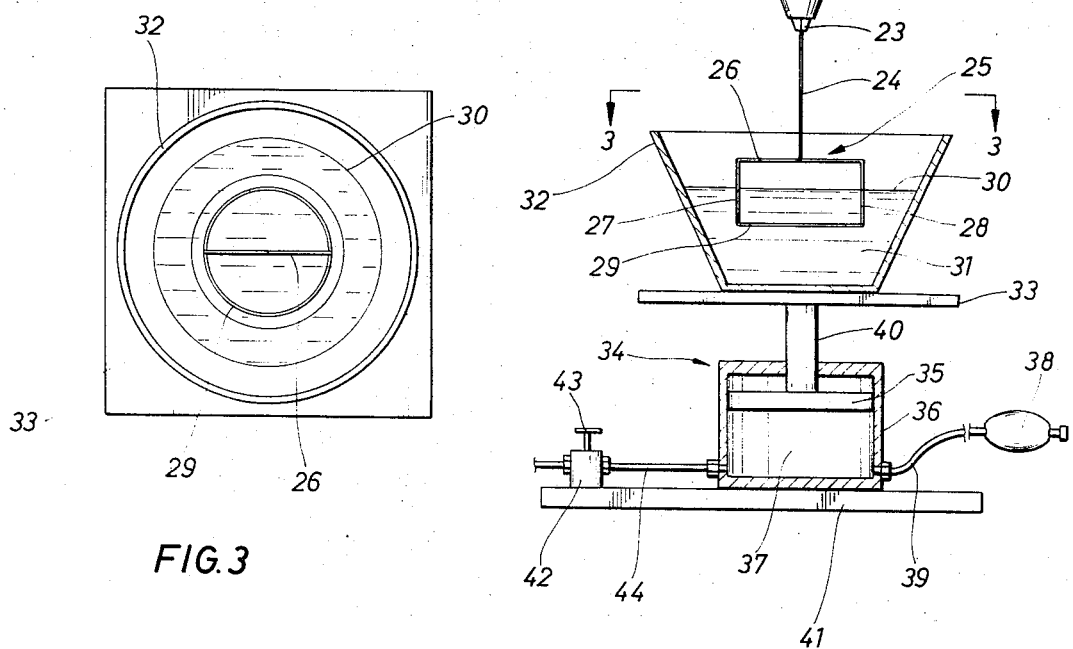

The lower stem section 56 may be provided with a needle chuck 61, constructed essentially identical with respect to the needle chuck 22, illustrated in FIG. 2. With a conventional duNouy tensiometer ring received within the needle chuck 61, the locking mechanism 50 may be manipulated to unlock the telescoping relation between stem sections 55 and 56 and the length of the tensiometer assembly 50 may be extended or shortened to position the duNouy ring in proper relationship with respect to the interface of the liquid to be tested.

In the event the tensiometer assembly is found to be considerably lighter or heavier than the weighing pan assembly which it is to replace, the weight of the tensiometer assembly may be readily varied by adding or removing one or more of the weight rings 54.

While the testing vessel 32 may be raised or lowered by electric, hydraulic or pneumatic control, it may also be appropriate to raise or lower the vessel by means of a manually manipulated mechanical mechanism. According to the present invention, a mechanical mechanism for raising or lowering the vessel 32 may conveniently take the form illustrated in FIG. 5, where a support base 62 of a mechanical jack mechanism may be employed to support the testing vessel 32. The jack mechanism may also employ a base 63 that may rest on the lower surface of the weighing chamber of an analytical balance. A conventional scissors type jack mechanism, illustrated generally at 64, may be connected to the support plate 62 and to the base 63 and may be manipulated by rotation of a shaft 64a which through a conventional system of levers transmits rotary movement of the shaft 64a, through a threaded stem and bushing arrangement, into vertical movement of support plate 62. If the liquid 31 within container 32 is of sufficient clarity to allow observation of the relative position of the ring portion 29 of the DuNouy ring, the relative positions of the ring 29 and the interface 30 may be adjusted rapidly by rotating shaft 64a to place the interface 30 in close proximity to the ring 29. Rotation of the shaft 64a then may be slowed to achieve an acceptably slow rate of downward movement in order to move the interface 30 downwardly very slowly past the ring 29. The tension necessary to move the interface downwardly past the ring 29 will of course be reflected on the digital readout mechanism of the analytical balance.

Figure 4:
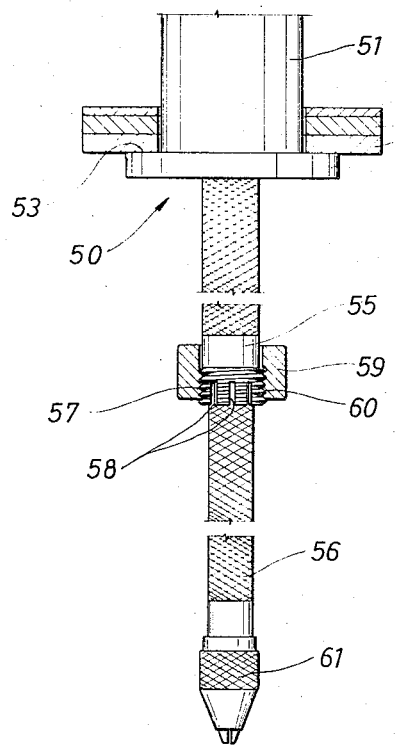
Figure 6:
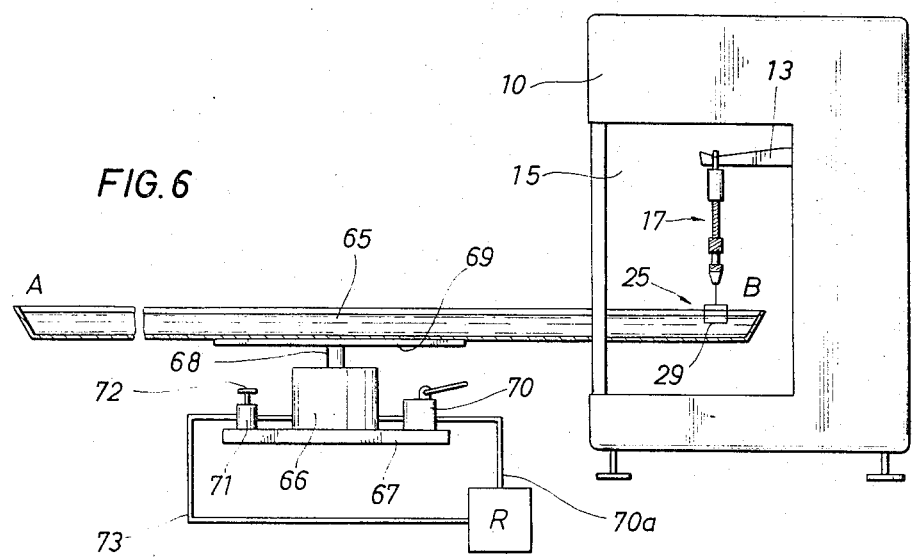

Referring now to FIG. 6, there is illustrated a testing arrangement by which the tensiometer assembly of FIGS. 2 and 4 may be employed to measure the spreading velocity of surface active molecules of a particular liquid. To accomplish the testing procedure for determining the velocity of surface active molecules an elongated trough-like vessel is provided that may be supported in a stabilized generally horizontal position with liquid disposed therein. One extremity B, of the trough-like vessel 65 may be positioned within the analytical balance weighing chamber 15 and a conventional deNouy ring 25, supported by a tensiometer assembly 17, may be disposed with the ring portion 29 thereof so positioned that the juncture between the interface "I" and the ring portion 29 will be in the distended condition that occurs immediately prior to rupture of the interface. To achieve this condition the vertical position of the elongated vessel 65 may be adjusted by any suitable jack mechanism so that the stationary distended interface is near the point of rupture. With the ring interface region in this condition, the optical scale reading of the analytical balance will be extremely sensitive to minute changes in the interfacial tension of the liquid within the vessel. The experimenter may then add a known quantity of a surface active material, also known as surfactant, to the interface at the opposite end "A" of the trough-like vessel 65 which changes the surface tension of the liquid within the vessel. The changed quality of the surface tension will be transmitted by the surface active molecules from point "A" to the duNouy ring, disposed at point "B", at the spreading speed of the surface active molecules of the liquid. As soon as the first few molecules arrive at the duNouy ring, an immediate change will take place in the amount of force necessary to maintain the interface in a distended position. This force change will be optically presented by the digital readout mechanism 11 of the analytical balance 10. The time required for the surface active molecules to traverse from point "A" to the duNouy ring is a "time-of-flight" value of the surface active molecules. The distance between the point of introduction of surfactant and the ring 29 may then be divided by the time-of-flight value to yield the spreading velocity of the surface active molecules.

The elongated trough-like vessel 65 may be supported by a hydraulic jack mechanism having a hydraulic cylinder 66 affixed to a support base 67 that may rest on any suitable support outside of the weighing chamber 15 of the analytical balance. The hydraulic cylinder 66 may include a reciprocatable actuating stem 68 having a support plate 69 secured to the upper extremity thereof and providing a support for the elongated trough-like vessel 65.

A hand pump 70 may be employed to supply pressurized hydraulic fluid from a reservoir "R" through a supply conduit 70a to the cylinder 66 below the actuating piston of the cylinder 66 for raising the piston upwardly and thereby causing upward movement of the support plate 69. For the purpose of lowering the support plate 69 for adjustment of the vessel 65, a bleed valve mechanism 71 may be employed that is controlled by an adjustable needle valve 72 to bleed hydraulic fluid from the cylinder 66 to the reservoir "R" through a bleed conduit 73. The hydraulic jack mechanism is capable of infinite adjustment and provides an extremely stable platform upon which the trough-like container may rest. The needle valve 72 may be manipulated manually in order to bleed fluid from the cylinder 66 at a controlled rate thereby achieving controlled downward movement of the measuring vessel and causing controlled relative movement between the interface and the ring portion of the duNouy ring supported by the tensiometer assembly. The hydraulic jack mechanism illustrated in FIG. 5 is not intended for use only with the apparatus for measuring the speed of surface active molecules, it being obvious that it may be employed in substitution for the electrically driven jack structure set forth in FIG. 1, the pneumatic jack structure set forth in FIG. 2, or the manually adjustable mechanical jack structure, illustrated in FIG. 5.

In view of the foregoing, it is evident that I have provided a novel tensiometer assembly that may be readily substituted for the weighing pan of substitution type analytical balances thereby converting the analytical balance for measurement of the surface or interfacial tension of a liquid medium. The tensiometer assembly may be properly weighted in order to compensate for the weight of the weighing pan with which an analytical balance may be provided. The tensiometer assembly may incorporate means for varying the weight thereof to compensate for the weight of weighing pans of various balance manufacturers. The tensiometer assembly may also be universally constructed for extension to any suitable length in order to compensate for differences in height of the weighing chambers of substitution type analytical balances of different manufacture.

A conventional duNouy ring may be supported by the tensiometer assembly in substantially rigid relation to the tensiometer assembly by a needle chuck thereby enhancing the capability of a tensiometer assembly for accurate measurement. By employing the tensiometer assembly of this invention and by substituting the same for the balance pan of a substitution type analytical balance there is developed a measuring mechanism having the measuring accuracy of a delicate substitution type analytical balance for accurate determination of surface and interfacial tension of various liquids including gas liquid interfaces and interfaces between quiescent liquids. The instant invention effectively allows the efficient measurement of interfacial tension even though the liquid being measured might be opaque or murky preventing visual observance of the relative positions of the interface and the duNouy ring. It is therefore seen that this invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth, or shown in the accompanying drawings, are to be interpreted as illustrative and not in a limiting sense.

Having thus described my invention in detail, I claim:

1. In combination with a substitution type analytical balance having a support arm with a support hook at the extremity thereof, the improvement comprising:
    a tensiometer assembly being of substantially the same weight as the weight of a weighing pan ordinarily supported by the support arm of said balance and having a support eye adapted to receive the support hook of said support arm;
    said tensiometer assembly depending directly from said support arm and having a needle chuck at the unsupported extremity thereof, said needle chuck receiving the vertical connector of said tensiometer ring and supporting said tensiometer ring in substantially rigid relation to said tensiometer assembly;
    means containing a liquid substance having an interface with a fluid;
    said tensiometer ring being supported with the ring portion thereof below said interface; and
    means for controllably moving said interface relative to said tensiometer ring.

2. The combination of claim 1 wherein:
    said means for moving said interface away from said ring support comprises collapsible support means for said container; and
    means for manually manipulating said collapsible support means to control collapsing thereof and thereby to control downward movement of said interface.

3. The combination of claim 1 wherein:
    said means for moving said interface away from said ring support comprises a support base for said container means; and
    motor means moving said support means and said container means at a controlled rate thereby moving said tensiometer ring through said interface at a controlled rate.

4. The combination of claim 1 wherein:
    said means for moving said interface away from said ring support comprises a support base for said container means; and
    fluid chamber means supporting said support base and having controllable bleed means for bleeding fluid from said fluid chamber means thereby lowering said container means and moving said interface downwardly through said tensiometer ring at a controlled rate.

5. A tensiometer assembly for substitution type analytical balances having a support arm defining a support hook, said tensiometer assembly comprising:
    support means having a support eye defined at the upper extremity thereof and receiving the support hook to suspend said tensiometer assembly from said support arm;
    said support means being of substantially the same weight as the weighing pan assembly of an analytical balance;
    a needle chuck being defined at the lower extremity of said support means;
    a vessel in which liquid may be placed to define an interface;
    a tensiometer ring having a vertical support element being releasably retained by said needle chuck assembly and supporting said tensiometer ring in substantially rigid relation with said connector means with the ring portion of said tensiometer ring disposed in generally horizontal manner and being submerged in said liquid; and
    means for moving said interface relative to said tensiometer ring to conduct measurement of interfacial tension of said liquid.

6. A tensiometer assembly as recited in claim 5:
    means for selectively varying the weight of said tensiometer assembly.

7. A tensiometer assembly as recited in claim 5:
    means for changing the overall length of said tensiometer assembly.

8. A tensiometer assembly as recited in claim 5:
    said tensiometer assembly having an elongated stem being defined by upper and lower telescopically related stem sections; and
    collet means releasably securing said stem sections in any desirable telescoped position for varying the overall length of said tensiometer assembly.

9. A tensiometer assembly as recited in claim 5:
    a support shoulder being defined on said tensiometer assembly; and
    at least one removable weight means being supported by said support shoulder for varying the weight of said tensiometer assembly.

10. A tensiometer assembly as recited in claim 5:
    said means for moving said interface relative to said tensiometer ring comprising a reciprocatable support for supporting said vessel; and
    means for controlling vertical movement of said reciprocatable support.

11. A tensiometer assembly as recited in claim 5:
    said means for moving said interface relative to said tensiometer ring comprising a support plate upon which said vessel rests;
    linear fluid motor means for imparting reciprocal movement to said support plate; and
    said fluid motor means having bleed means for accurately establishing a desirable rate of downward movement of said interface relative to said tensiometer ring.

* * * * *

FO 1050
(5/69)

UNITED STATES PATENT OFFICE
CERTIFICATE OF CORRECTION

Patent No. 3,780,569           Dated December 25, 1973

Inventor(s) John W. Graham

It is certified that error appears in the above-identified patent and that said Letters Patent are hereby corrected as shown below:

Col. 6, line 54, "50" should read --58--;

Col. 6, line 60, "50" should read --59--.

Signed and sealed this 9th day of July 1974.

(SEAL)
Attest:

McCOY M. GIBSON, JR.          C. MARSHALL DANN
Attesting Officer             Commissioner of Patents